(12) United States Patent
Agthe et al.

(10) Patent No.: US 9,398,292 B2
(45) Date of Patent: Jul. 19, 2016

(54) COMPRESSION AND DECOMPRESSION OF REFERENCE IMAGES IN VIDEO CODING DEVICE

(75) Inventors: Bernhard Agthe, Feldkirchen (DE); Peter Amon, München (DE); Gero Bäse, München (DE); Andreas Hutter, München (DE); Robert Kutka, Geltendorf (DE); Norbert Oertel, Landshut (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 557 days.

(21) Appl. No.: 13/979,601

(22) PCT Filed: Jan. 12, 2012

(86) PCT No.: PCT/EP2012/050430
§ 371 (c)(1),
(2), (4) Date: Sep. 18, 2013

(87) PCT Pub. No.: WO2012/095487
PCT Pub. Date: Jul. 19, 2012

(65) Prior Publication Data
US 2014/0003517 A1    Jan. 2, 2014

(30) Foreign Application Priority Data
Jan. 12, 2011    (EP) ..................................... 11150714

(51) Int. Cl.
| H04B 1/66 | (2006.01) |
| H04N 11/02 | (2006.01) |
| H04N 11/04 | (2006.01) |
| H04N 19/423 | (2014.01) |
| H04N 19/159 | (2014.01) |
| H04N 19/147 | (2014.01) |
| H04N 19/46 | (2014.01) |

(Continued)

(52) U.S. Cl.
CPC ....... *H04N 19/00484* (2013.01); *H04N 19/117* (2014.11); *H04N 19/124* (2014.11); *H04N 19/147* (2014.11); *H04N 19/159* (2014.11); *H04N 19/423* (2014.11); *H04N 19/428* (2014.11); *H04N 19/46* (2014.11)

(58) Field of Classification Search
None
See application file for complete search history.

(56) References Cited

U.S. PATENT DOCUMENTS 5,818,530 A    10/1998    Canfield et al.
5,933,195 A    8/1999    Florencio (Continued)

FOREIGN PATENT DOCUMENTS

| CN | 102215399 | 10/2011 |
| EP | 11150714.1 | 1/2011 |

(Continued)

OTHER PUBLICATIONS

Office Action dated May 27, 2015 in corresponding European Patent Application No. 12700392.9.

(Continued)

*Primary Examiner* — Hung Dang
(74) *Attorney, Agent, or Firm* — Slayden Grubert Beard PLLC (57) ABSTRACT

A reconstructed image is provided within the framework of predictive coding. The reconstructed image is compressed according to a coding mode of an image coding device and stored in a reference image memory.

15 Claims, 6 Drawing Sheets

(51) Int. Cl.
*H04N 19/117* (2014.01)
*H04N 19/124* (2014.01)
*H04N 19/426* (2014.01)

(56) References Cited

U.S. PATENT DOCUMENTS

| | | | |
|---|---|---|---|
| 6,208,689 | B1 | 3/2001 | Ohira et al. |
| 6,229,852 | B1 | 5/2001 | Hoang |
| 6,243,421 | B1 | 6/2001 | Nakajima et al. |
| 6,470,051 | B1 | 10/2002 | Campisano et al. |
| 6,983,101 | B1 | 1/2006 | Sugimura et al. |
| 8,233,534 | B2 | 7/2012 | Wasily |
| 8,553,767 | B2 | 10/2013 | Koto et al. |
| 2006/0008006 | A1* | 1/2006 | Cha ............... H04N 19/176 375/240.16 |
| 2007/0230572 | A1 | 10/2007 | Koto et al. |
| 2008/0170626 | A1 | 7/2008 | Sung et al. |
| 2008/0253456 | A1* | 10/2008 | Yin ............... H04N 19/105 375/240.16 |
| 2010/0098169 | A1 | 4/2010 | Budagavi |
| 2010/0284471 | A1* | 11/2010 | Tsai ............... H04N 19/70 375/240.24 |
| 2011/0249723 | A1 | 10/2011 | Wasily |

FOREIGN PATENT DOCUMENTS

| | | |
|---|---|---|
| JP | 9-247673 | 9/1997 |
| JP | 10-66081 | 3/1998 |
| JP | 10-98731 | 4/1998 |
| JP | 2000-287168 | 10/2000 |
| JP | 2002-77925 | 3/2002 |
| JP | 2003-348592 | 12/2003 |
| JP | 2007-166323 | 6/2007 |
| JP | 2007-266970 | 10/2007 |
| JP | 2010-98352 | 4/2010 |

OTHER PUBLICATIONS

Wahadaniah et al., "TE2: Reference frame compression using image coder", Joint Collaborative Team on Video Coding (JCT-VC) of ITU-T SG16 WP3 and ISO/IEC JTC1/SC29/WG11, China, Oct. 2010, pp. 1-7.

Aoki et al., "TE2: 1-D DPCM-based memory compression", Joint Collaborative Team on Video Coding (JCT-VC) of ITU-T SG16 WP3 and ISO/IEC JTC1/SC29/WG11, China, Oct. 2010, pp. 1-12.

Office Action dated Feb. 2, 2015 in corresponding Japanese Patent Application No. 2013-548842.

Office Action dated Nov. 4, 2015 in corresponding Chinese Patent Application No. 201280005271.5.

H. Aoki et al.; "Performance report of DPCM-based memory compression on TE2"; Document JCTVC-B057, Joint Collaborative Team on Video Coding (JCT-VC) of ITU-T SG16 WP3 and ISO/EIC JTC1/SC29/WG11; Jul. 2010; pp. 1-19.

M. Budagavi et al.; "ALF memory compression and IBDI/ALF coding efficiency test results on TMuC-0.1"; Document JCTVC-B090; Joint Collaborative Team on Video Coding (JCT-VC) of ITU-T SG16 WP3 and ISO/EIC JTC1/SC29/WG11; Jul. 2010; pp. 1-5.

C.S. Lim et al.; "Reference Frame Compression Using Image Coder"; Document JCTVC-B103; Joint Collaborative Team on Video Coding (JCT-VC) of ITU-T SG16 WP3 and ISO/EIC JTC1/SC29/WG11; Jul. 2010; pp. 1-44.

Demircin et al.; "TE2: Compressed Reference Frame Buffers (CRFB)"; Document JCTVC-B089; Joint Collaborative Team on Video Coding (JCT-VC) of ITU-T SG16 WP3 and ISO/EIC JTC1/SC29/WG11; Jul. 2010; pp. 1-9.

International Search Report for PCT/EP2012/050430; mailed Jun. 1, 2012.

* cited by examiner

COMPRESSION AND DECOMPRESSION OF REFERENCE IMAGES IN VIDEO CODING DEVICE

CROSS REFERENCE TO RELATED APPLICATIONS

This application is the U.S. national stage of International Application No. PCT/EP2012/050430, filed Jan. 12, 2012 and claims the benefit thereof. The International Application claims the benefit of European Application No. 11150714.1 filed on Jan. 12, 2011, both applications are incorporated by reference herein in their entirety.

BACKGROUND

Described below are methods and devices for providing a reconstructed image.

In the past years picture formats requiring to be coded have been steadily increasing in size due, for example, to the introduction of novel types of recording systems. Thus, one of the changes taking place at the present time is a transition from a television transmission system known as PAL (Phase Alternation Line method), which has been used in Europe over the last 50 years and is based on a frame size of 625×576 pixels, to an HDTV (High Definition Television) format with 1920× 1080 pixels or 1280×720 pixels. It is to be expected that in the future even larger image formats will be introduced in new types of television systems.

HDTV and future systems use digital compression methods in order to compress a sequence of video images (frames) in such a way that these can be transmitted for example over the internet or via mobile communication channels. However, the increase in size of the frame formats has also led to a considerable increase in the computing power required in order to compress the video data sequence and in the amount of storage space required for this. A consequence of this is that there is also a considerable increase in data transfer between memory and computing units that implement the compression methods.

For this reason study groups such as the Joint Collaborative Team on Video Coding (JCT-VC) for example, a joint working party of the ITU and the ISO/IEC (ITU—International Telecommunication Union, ISO—International Standardization Organization, IEC—International Electrotechnical Commission) are working not only on improving the compression rate, but also on standardized methods to enable video images to be stored efficiently in reference frame buffers of the respective codecs and accessed in a manner that is economical in terms of resources.

Figure 1:
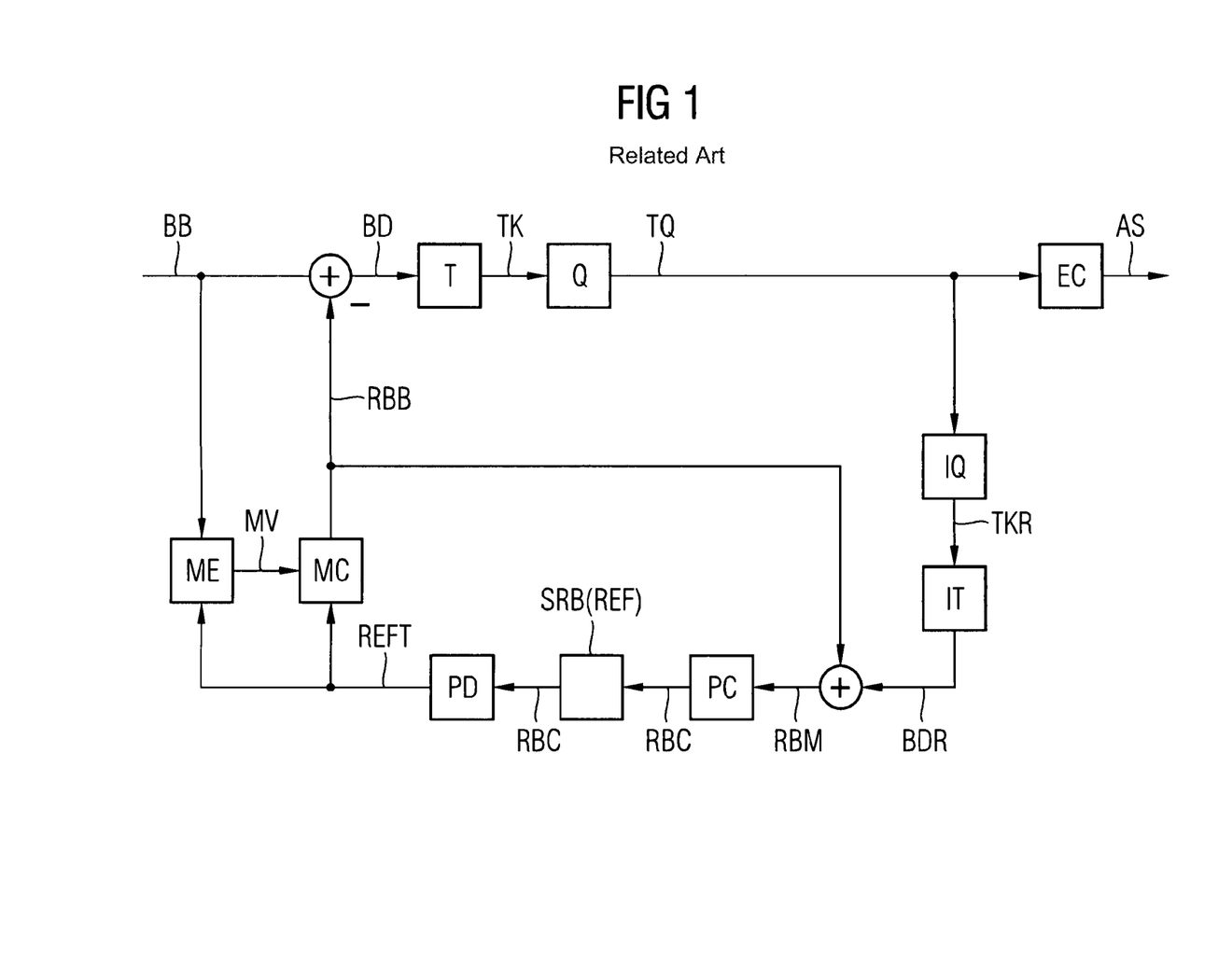
FIG. 1 shows an encoder known from the related art for compressing frame data.

FIG. 1 shows a known device for compressing a sequence of frames, the device having a reference frame buffer SRB. In this case frames are coded for example by a predictive coding scheme, also known as inter coding mode. One of the frames is decomposed into frame blocks BB, for example 16×16 pixels, and is subsequently encoded frame block by frame block. For one of the frame blocks a search is then made for a reference frame block RBB in a reference frame REF which provides a good basis for estimating a frame content of the frame block. For this purpose the frame block is passed to a motion estimation unit ME which, on the basis of a reference subframe REFT that includes parts of the reference frame REF following a frame decompression by a frame decompression unit PC, selects the reference frame block from the reference subframe and signals the selected reference frame block to a motion compensation unit MC by a motion vector MV. The motion compensation unit provides the reference frame block on the basis of the reference frame and the motion vector.

Next, a difference frame block BD is generated by subtracting the reference frame block RBB from the frame block BB. The difference frame block is subsequently subjected to a transformation in a transformation unit T, for example in accordance with a discrete cosine transform method. At the output of the transformation unit there are transform coefficients TK available which are subsequently supplied to a quantization unit Q for quantization. At the output of the quantization unit there are quantized transform coefficients TQ available which are converted into an output signal AS by entropy coding performed by an entropy coding unit EC.

The quantized transform coefficients TQ are converted in a feedback loop into reconstructed transform coefficients TKR by an inverse quantization performed by an inverse quantization unit 10. The reconstructed transform coefficients TKR are transformed into a reconstructed difference frame block BDR by inverse transformation by an inverse transformation unit IT. Following this a reconstructed frame block RBM is generated by adding the reconstructed difference frame block BDR and the reference frame block RBB.

In older coding methods the reconstructed frame block is written directly into the reference frame buffer. In methods currently undergoing standardization, in order to reduce a data volume the reconstructed frame block is initially subjected also to frame compression by a frame compression unit PC which significantly reduces the data volume of the reconstructed frame block. A compressed reconstructed frame block RBC produced as a result of the frame compression unit PC is subsequently stored in the reference frame buffer. In order to allow the motion estimation unit and the motion compensation unit access to the required frame data, when a reference frame REF or a specific detail of the reference frame is requested the respective compressed reconstructed frame block is first read out from the reference frame buffer SRB and converted into a reference subframe REFT by frame decompression performed by a frame decompression unit PD.

Figure 2:
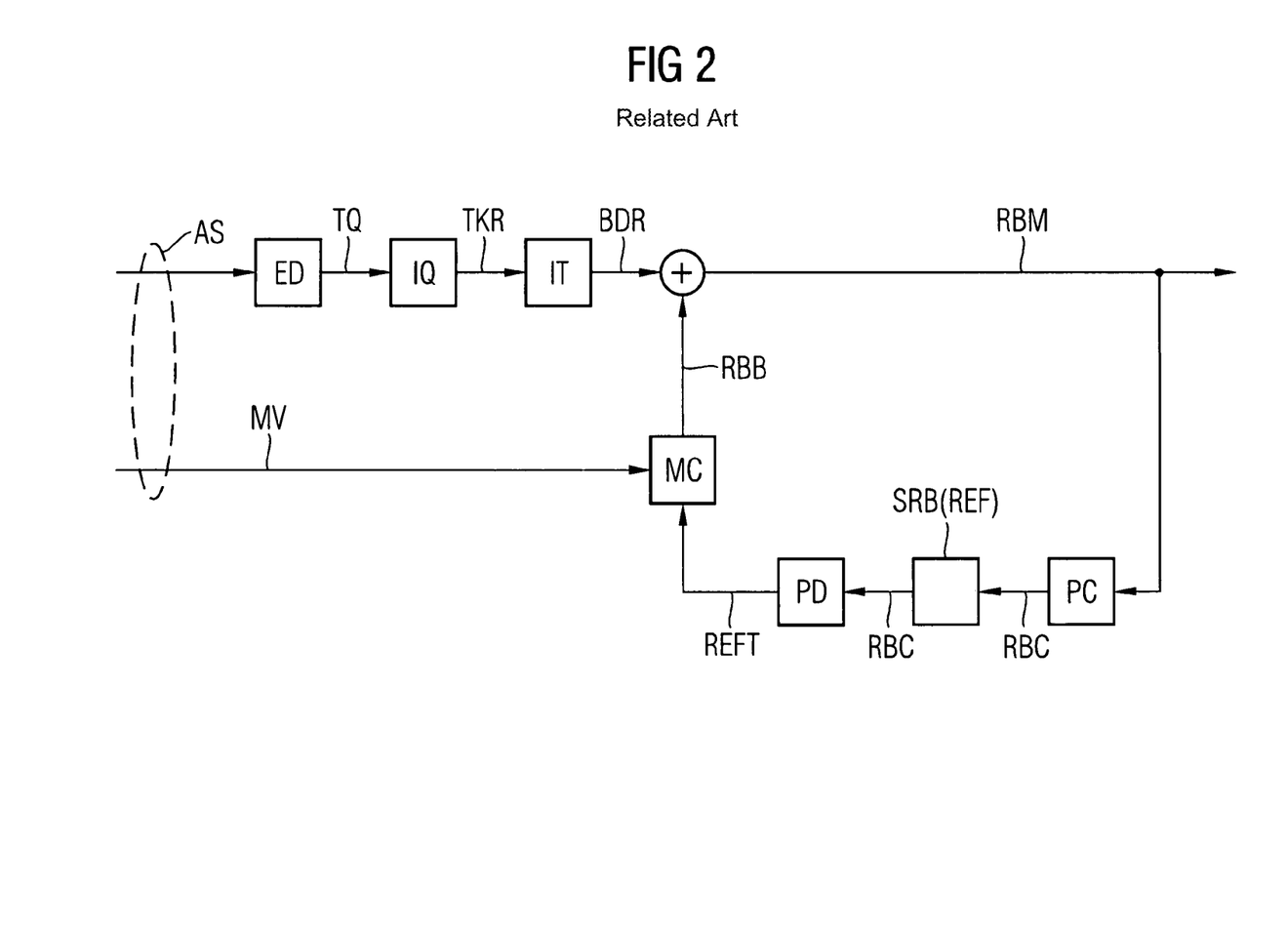
FIG. 2 shows a decoder known from the related art for decompressing compressed frame data.

FIG. 2 shows a decoder corresponding to the encoder shown in FIG. 1. In this case the output signal AS is decoded into quantized transform coefficients TQ by an entropy decoding unit ED. Furthermore the quantized transform coefficients are inversely quantized into reconstructed transform coefficients TKR by the inverse transformation unit IQ. This is followed by an inverse transformation of the reconstructed transform coefficients TKR into a reconstructed difference frame block BDR by the inverse information unit IT.

In addition to the output signal the respective motion vector MV, inter alia, is also transmitted to the decoder. From this, using the reference subframe REFT, the decoder can determine by the motion compensation unit MC the reference frame block RBB, which is converted into the reconstructed frame block RBM by addition with the reconstructed difference frame block.

The reconstructed frame block RBM can be visualized for example on a display. The reconstructed frame block RBM is subsequently converted by a compression performed by the frame compression unit PC into the compressed reconstructed frame block RBC, which is then stored in the reference frame buffer SRB. The compressed reconstructed frame blocks stored in the reference frame buffer can be decompressed into the reference subframe by the frame decompression unit PD.

Chong Soon Lim's article "Reference frame compression using image coder", ISO/IEC JCTVC-B103 2nd Meeting, Geneva, July, 2010, describes a lossless frame compression method/frame decompression method in which bit-plane coding is performed following a floating-point DCT transform (DCT—Discrete Cosine Transform) and scanning of coefficients in a one-dimensional representation, arranged two-dimensionally after the transformation.

In an article by Mehmet Umut Demircin et al., "Compressed Reference Frame Buffers (CRFB)" ISO/IEC JCTVC-B089 2nd Meeting, Geneva, July 2010, a buffer memory access bandwidth reduction technique was proposed. In this case, as well as a transformation and quantization, a DC prediction and entropy coding are proposed for the frame compression unit PC or an inverse thereof for the frame decompression unit PD.

In Madhukar Budagavi's article "ALF memory compression and IBDI/ALF coding efficiency test results in TMuC-0.1", JSO/IEC JCTVC-B090, test results for compression and decompression of frame data upstream and downstream, respectively, of a deblocking frame memory are presented.

Hirofumi Aoki's article "DPCM-based memory compression", ISO/IEC JCTVC-B057 2nd Meeting, Geneva, July 2010, finally, a one-dimensional DPCM-based frame memory compression method (DPCM—Differential Pulse Code Modulation) is presented.

At least the compression methods proposed in Lim's and Aoki's articles are lossless.

SUMMARY

The methods and devices described herein make it possible to provide a resource-efficient implementation for the compression/decompression of reconstructed frame blocks for a frame encoding device and/or frame decoding device.

Described below is a method for storing at least one frame zone of a reconstructed frame that is generated by a frame encoding device or a frame decoding device, and for providing the at least one frame zone as a reference frame for the frame encoding device or frame decoding device, the method including
a) compressing the at least one frame zone into compressed data on the basis of a first rule;
b) storing the compressed data;
c) decompressing the compressed data (KDAT) into the at least one frame zone (BR) on the basis of a second rule (V2);
characterized in that
d) the first rule (V1) is formed on the basis of a third rule (V3), the third rule (V3) defining a coding mode (M1) of the frame encoding device (ENC),
e) the second rule (V2) is formed in that the second rule (V2) is chosen as an inverse third rule (V3I) to the third rule (V3).

The method enables memory-efficient storage of reference frames that are required in the course of encoding by the frame encoding device or decoding by the frame decoding device. It is of advantage that the reconstructed frames, i.e. the reference frames, are compressed on the basis of one of the coding modes of the frame encoding device. As a result, it is possible inter alia to arrive at an implicit rule for creating the first and second rule for compressing and decompressing, respectively. Furthermore a coding decision of the frame encoding device for encoding a frame block often follows a rate-distortion optimization which optimizes image quality with minimum storage overhead. This optimum encoding mode then forms the basis for compressing the frame zone of the reconstructed frame, as a result of which a high compression rate can also be achieved. In addition a multiplicity of devices available on the market provide hardware support for processing at least substeps that are performed in the frame encoding device and/or frame decoding device. Accordingly the compression or decompression of the reference frame can also make use of this hardware support.

In today's standardized frame encoding devices and frame decoding devices, prior to being stored the reconstructed frames are often subjected to a deblocking filter and/or further filter operations, such as a Wiener filter for example. In a development, filtering may not be performed until after the decompression. This enables coding modes that are available for the respective frame zone of the reconstructed frame, transformed or quantized coefficients to be used by the compression in order to achieve an improved compression rate.

The compressed data may be stored together with an index in the reference frame buffer, the index including an identifier for uniquely identifying the first rule or the second rule. This also allows compression or decompression modes to be used which cannot be determined implicitly and which achieve a better compression rate than modes that can be determined implicitly.

In a development, the coded data is stored in accordance with a syntax for generating an output data stream that is (i) generated by the frame encoding device and/or (ii) received by the frame decoding device. As a result, the frame decoding device receives information indicating the manner in which the frame encoding device has compressed and decompressed, possibly not losslessly, individual frame zones of the reconstructed frames. In this way a drift between frame encoding device and frame decoding device can be avoided.

In an advantageous development a plurality of frame zones of the reconstructed frame are combined into a frame region and stored as decompressible independently of other frame regions of the same reconstructed frame. This means that the frame regions of a reconstructed frame can be accessed independently of other frame regions of the same reconstructed frame. This reduces a computational overhead for the decompression and an access time for accessing frame contents of a frame region, since no frame contents of other frame regions need to be decompressed apart from the requested frame region.

Advantageously the respective frame zones of the frame region are compressed either according to a single first rule or according to a sequence of respective first rules. This results in a reduced signaling overhead and consequently a reduced storage space requirement, since it is not necessary to store an individual first or second rule in the reference frame buffer for each frame zone.

Advantageously at least some of the frame zones of the frame region are compressed by an intra prediction mode, wherein first pixels required for reconstructing at least one pixel of the frame region and determinable only by a different frame region than the frame region are stored in addition to the compressed data (of the frame region). A use of the intra prediction mode can be realized in a simple manner.

If the first pixels are compressed according to a predefinable rule, in particular according to a delta coding scheme, and stored, a storage space requirement for storing the frame zone in compressed form is further reduced by the intra prediction mode.

In an advantageous development, at least one of the frame zones of the frame region is compressed by an intra coding mode instead of by the intra prediction mode. In this case frame zones that are difficult to predict, due for example to frame noise or strong movement, can also be efficiently compressed.

Advantageously the mode that has the lowest storage space requirement for the frame zone that is to be compressed is selected from a number of modes, formed (i) by at least two different intra prediction modes or (ii) by at least one intra prediction mode and the intra coding mode. What is achieved by this optimization is that the reconstructed frame can be decompressed while maintaining good quality and at the same time can be compressed at a high compression rate.

If a quantization parameter used for the intra prediction is stored during an intra prediction mode, high-quality decompression can be ensured.

In another development, at least two reconstructed frames are stored, a first of the at least two reconstructed frames being compressed by an intra prediction mode and/or intra coding mode and a second of the at least two reconstructed frames following the first reconstructed frame in time being compressed by an inter coding mode whose motion vectors point to the first reconstructed frame. An increase in the compression rate as compared with intra prediction only can be achieved as a result.

The first rule may be generated on the basis of the third rule by one of the following:
  If the third rule describes an intra coding mode, then the first rule is formed by the same intra coding mode;
  if the third rule describes a coding mode in which (i) a macroblock/frame block to be coded is encoded by a "skip" signal, i.e. without motion vector, and (ii) the reference frame of the macroblock/frame block to be coded is encoded by an intra coding mode, then the intra coding mode chosen for the first rule is that which is used for coding the reference frame;
  if the third rule for the frame block/macroblock uses an inter coding mode with associated motion vectors, then the first rule is chosen identically to the third rule, the motion vector for the inter coding mode being chosen identically to the third rule and to the first rule.

By applying one of these rules it is possible to achieve an implicit signaling of the first and second rule used for compression and decompression, respectively. Furthermore already optimized coding modes can be reused for the compression, as a result of which computational overhead for determining an optimal first rule can be avoided.

In an advantageous development, according to one of the preceding embodiments, at least one of the following parameters is signaled between frame encoding device and frame decoding device in order to synchronize the method in the frame encoding device and in the frame decoding device:
  the index for the frame zone of the reconstructed frame or for a frame region of the reconstructed frame, the index including an identifier for uniquely identifying the first rule or the second rule;
  a quantization factor which is used in an intra prediction mode or intra coding mode for compressing at least one of the frame zones.

A compression rate can be increased by this means because the compression does not have to be performed only on the basis of first rules that can be implicitly signaled. Accordingly a greater choice of third rules is available for selection which can be taken into account by the first rule.

In addition to the cited rules the first and second rule can be determined in accordance with at least one of the following procedures:
a) Use of different compression methods performed by the frame compression unit or frame decompression unit:
  explicit signaling of the compression method used in the output signal;
  assignment of compression methods in each case to profiles and profiles/levels that are used by the frame encoding device or frame decoding device for coding a frame block;
b) parameters that describe the compression method:
  assignment of parameter sets to profile/level combinations
  signaling/transmission of parameters inband or as separate parameter set;
  parameter reduction on the basis of available data, e.g. preceding frame, currently used quantization parameter;
c) possibilities for reducing the parameters on the basis of available data:
  logged statistics
  for a subframe which is intra coded:
    o) adoption of the current coding mode, or
    o) change of mode to a particular or very similar intra compression mode;
    o) derivation of the prediction direction (to be used by other compression mode)
  derivation of the parameters by another coding, in particular from the quantization (quantization increment or quantization parameter), transform operations and filter operations.

The derivation can include a conversion of the number range, special rounding of calculated values, but also formulas for direct calculation of the parameters.

If a parameter derivation is not based on data that is already available on the decoder side, then the following is possible:
  determination of statistics of the frame that is to be compressed
  use of other side information, e.g. sensor information
  multipath encoding—optimization of the parameters by taking into account a plurality of frames or a complete sequence (also qualified for selection of a compression method);
  detection of scene cuts, for example a frame does not need to be compressed because it is not used as a reference frame;
  use of specially available parameters for long-term reference frames, for example a very high quality, could be lossless;
Constraints:
  data rate restrictions of the transmission channel allow coarser parameters to be used;
  quality limits at frame level necessitate statistically based approaches because the processing is performed block by block;
  quality limits at block level could relate directly to the quality of a block that is to be compressed;
  minimum quality to be achieved, maximum volume of data generated and internal data bus throughput as potential limit for parameter derivation and process selection;

The use of compression for reference information results in different storage footprints (=storage patterns or storage requirements) for each reference frame. This is a consequence in particular of the use of different compression processes and of the fact that the parameters for the compression process are derived in a dynamic manner.
  storage organization (for example subdivision of frame data into subdomains=of a specific size) determines storage utilization and hence the number of reference frames;
  assignment of a storage management scheme in respect of parameters associated with profile/level combinations, e.g. subdomain size.

The advantage of these approaches: signaling and/or derivation of the parameters are/is required for controlling an identical behavior of the compression process for reference information in encoder and decoder in an optimized manner for subsequent processing, memory sizes and internal data bus throughput as well as for image quality requirements.

Also described below is a device for storing at least one frame zone of a reconstructed frame that has been generated by a frame encoding device or by a frame decoding device, and for providing the at least one frame zone as a reference frame for the frame encoding device or frame decoding device, the device including
a) frame compression unit for compressing the at least one frame zone into compressed data on the basis of a first rule;
b) memory unit for collectively storing the compressed data;
c) frame decompression unit for decompressing the compressed data into the at least one frame zone on the basis of a second rule;
characterized in that
d) the first rule is formed on the basis of a third rule, the third rule defining a coding mode of the frame encoding device;
e) the second rule is formed in that the second rule is an inverse third rule to the third rule.

The device additionally has a processing unit which is embodied in such a way that at least part of the method described above can be implemented and carried out. The advantages of the device are analogous to those of the method.

Finally, a use of the aforementioned method or device according to one of the above embodiments in a frame encoding device (ENC) and/or frame decoding device is part of the invention. As a result, it is possible to implement and carry out the method and its developments in an advantageous manner.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, elements having the same function and mode of operation are labeled with the same reference signs.

FIGS. 1 and 2 show an encoder and decoder, respectively, for frame coding and decoding according to the related art. FIGS. 1 and 2 have been explained at length in the introduction, so reference will be made at this point to the description given in the introduction.

In the following description at least one frame zone BR of a reconstructed frame RBD is to be understood to mean for example a reconstructed frame block RBC. Furthermore at least one frame zone of a reference frame is to be understood to mean for example a reference frame block. Moreover the reference frame buffer is also referred to as memory unit SRB.

Encoders and decoders generally use the reference frame buffer to support different predictive coding modes. The coding mode presented in FIGS. 1 and 2 is an inter coding mode in which reconstructed frame contents of a frame that was encoded and decoded or, as the case may be, reconstructed at an earlier instant in time is used for predicting a frame that is to be encoded or decoded at the present instant in time. A multiplicity of predictive encoding modes and corresponding decoding modes are described in the related art, so they will not be discussed in further detail here.

Figure 3:
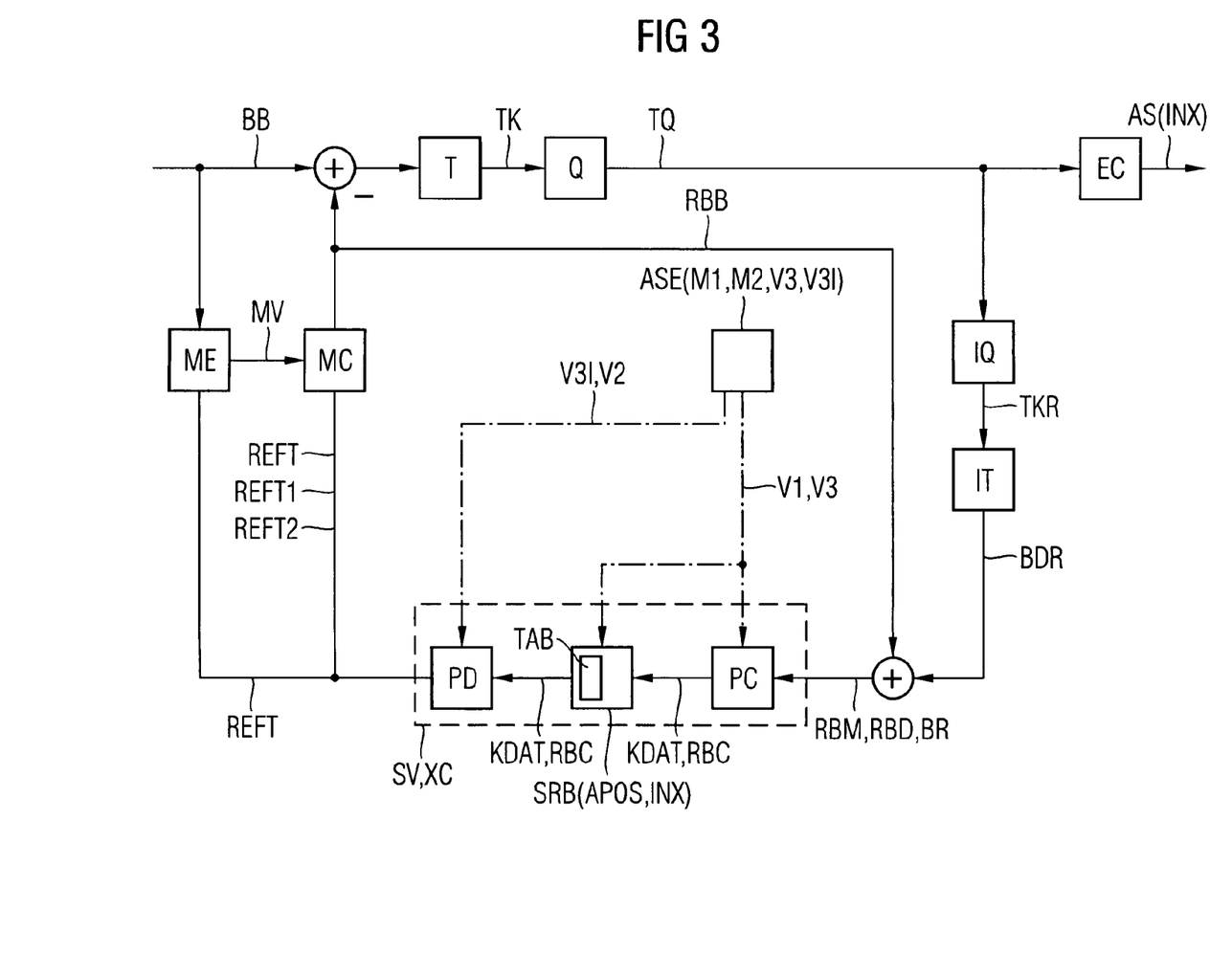
FIG. 3 shows a first exemplary embodiment of a frame encoding device.

FIG. 3 schematically shows a frame encoding device ENC, referred to hereinbelow as an encoder, which generates the output signal AS from frames with frame blocks BB. Its mode of operation is similar to a mode of operation of the device according to FIG. 1. In this case the frame zone BR of the reconstructed frame RBD is used as a synonym for the reconstructed frame block RBM, the reconstructed frame including all of the reconstructed frame blocks associated with the frame, and compressed data KDAT is used as a synonym for the compressed reconstructed frame block RBC.

From a plurality of coding modes M1, M2, a selection unit ASE selects that mode which, in the case of a predefinable image quality, minimizes a storage space requirement for storing the output signal, or, in the case of a predefinable storage space requirement for storing the respective frame block after coding, maximizes the image quality of the reconstructed frame block corresponding to the frame block. Each of the coding modes M1, M2 in each case represents one of possible third rules V3 describing the coding of the frame block. Analogously thereto, for each of the coding modes M1, M2 there is associated with the third rule V3 in each case an inverse third rule V3I which defines the decoding of an encoded frame block.

Example illustrating the third rule V3 according to FIG. 1:
select reference frame block RBB from the reference subframe REFT
generate difference frame block BD by subtracting the reference frame block from the frame block BB of the frame;
generate transform coefficients TK from difference frame block BD by cosine transformation;
generate quantized transform coefficients TQ from transform coefficients TH by quantization;

Example illustrating an inverse third rule V3I to the third rule according to FIG. 1 or 2:
generate reconstructed transform coefficients TKR from quantized transform coefficients TQ by inverse quantization;
generate reconstructed difference frame block BDR from reconstructed transform coefficients TKR by inverse transformation;
generate reconstructed frame block RBM by adding the reference frame block RBB and the reconstructed difference frame block BDR As shown in FIG. 3, the third rule V3 of the frame compression unit PC linked to the selected coding mode is passed as the first rule. The frame compression unit compresses the reconstructed frame block RBM according to the first rule, which is either identical to the third rule or derived from the latter. Examples illustrating this are:

If the third rule describes an intra coding mode, then the same intra coding mode can be used for the first rule.

If the third rule describes an intra coding mode in which (i) a macroblock/frame block that is to be encoded has been coded by a "skip" signal and without motion vector and (ii) the reference frame has been coded by an intra coding mode, then as the first rule a coding mode is provided in which the macroblock/frame block that is to be encoded is used by the intra coding mode that was used for coding the reference frame.

If the third rule uses an inter coding mode with associated motion vectors for the frame block/macroblock, then the third rule can be adopted as the first rule for compressing the reconstructed frame block/macroblock, i.e. in order to compress the reconstructed frame block the frame compression unit also uses the inter coding mode according to the third rule and the identical motion vector.

The compressed data KDAT is generated as a result of the compression of the reconstructed frame block RBM. The compressed data is stored with a position pointer APOS which reflects the position of the reconstructed frame block in the reference frame or in the reconstructed frame RBD describing the reconstructed frame blocks. As a result, it is possible to locate coded units, such as of the reconstructed frame block. In order to enable specific frame zones in the reference frame to be accessed a table TAB is created in the reference frame buffer to indicate at which storage position the compressed data belonging to the reconstructed frame block or to a frame zone in the reconstructed frame can be found. If the compressed data does not allow an unequivocal decompression by the decompression unit, an index INX can be attached to the compressed data and stored in the reference frame buffer, the index INX including an identifier for uniquely identifying the first rule and/or the second rule. The decompression unit can thus establish the second rule V2 with the aid of the index INX and determine the reference subframe REFT from the compressed data KDAT. Alternatively the index can be stored in the table TAB.

The frame compression unit PC, the frame decompression unit PD and the reference frame buffer SRB are combined in the form of compression module XC, also referred to as device SV.

In the above example a first rule was able to be obtained directly from the third rule. In the event that the assignment of the first rule to the third rule is not unique, an information field containing the index INX that explicitly signals the first rule can additionally be inserted in the output signal.

Figure 4:
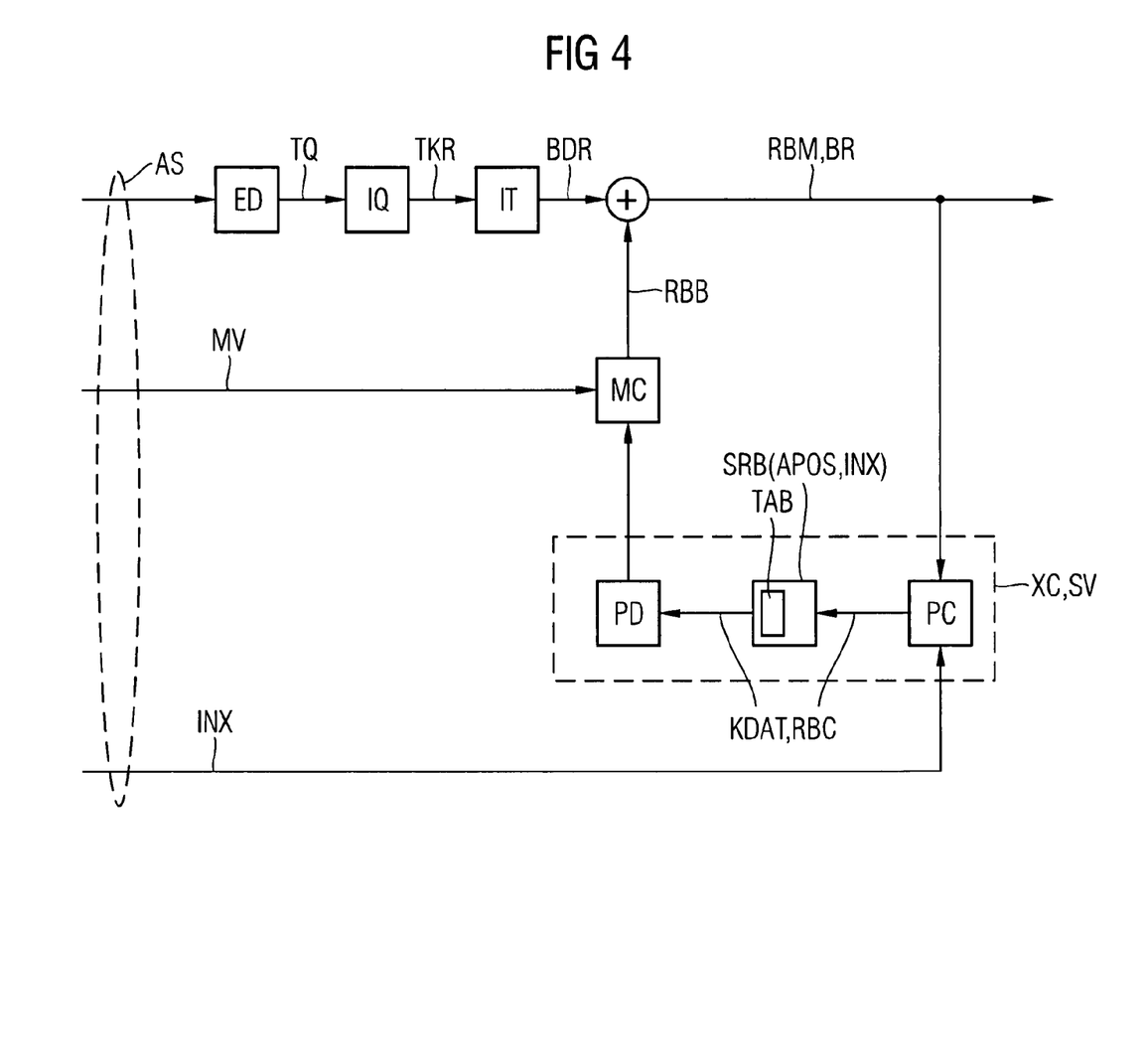
FIG. 4 shows a first exemplary embodiment of a frame decoding device.

FIG. 4 shows an approach to applying the method in a frame decompression unit DEC, referred to hereinbelow as a decoder. An output signal is received and processed analogously to FIG. 2. The terms are used analogously to FIG. 3. The compression module with its units, frame compression unit PC, frame decompression unit PD and reference frame buffer SRB, operates analogously to the description given with reference to FIG. 3. In contrast to the encoder according to FIG. 3, no coding modes are independently selected in the case of the decoder. Rather, either the third rule is communicated explicitly to the decoder by the information field in the output signal, for example by the index INX, or the special embodiment of the third rule is explicitly specified in the encoder and decoder, or the decoder can derive the third rule with certainty from the output signal, for example with the aid of a coding mode used for encoding a frame block or on the basis of the frame content. The inverse third rule can then be unequivocally derived from the third rule. It would be very helpful if encoder and decoder use the identical third or inverse third rule for compressing and decompressing the same frame block. Otherwise coding artifacts can be the consequence.

In another exemplary embodiment an intra prediction mode is employed by the frame compression unit or frame decompression unit. The intra prediction mode is characterized in that a frame block that is to be compressed is predicted by a reconstructed frame section in the same frame as the frame block that is to be compressed and the resulting error signal is coded together with information relating to the prediction, such as prediction mode or motion vector, for example. Standard H.264/AVC defines nine different intra prediction modes, with the following names:

| intra prediction mode | Name |
| --- | --- |
| Mode 0: | Vertical |
| Mode 1: | Horizontal |
| Mode 2: | DC mode (direct component mode) |
| Mode 3: | Diagonal-Down-Left |
| Mode 4: | Diagonal-Down-Right |
| Mode 5: | Vertical-Right |
| Mode 6: | Horizontal-Down |
| Mode 7: | Vertical-Left |
| Mode 8: | Horizontal-Up |

Figure 5A:
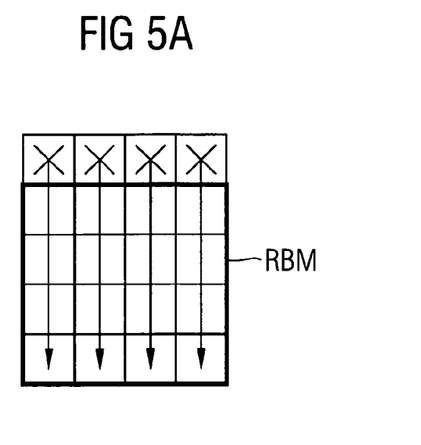
FIGS. 5a and 5b show two intra prediction modes according to standard H.264/AVC.
Figure 5B:
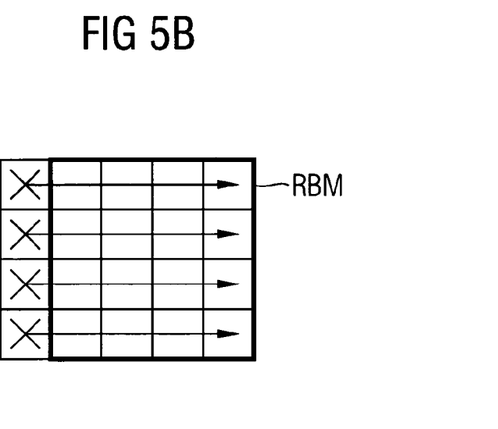

Mode 0 and mode 1 are shown by way of example in FIG. 5*a* and FIG. 5*b*, respectively. The reconstructed frame block composed of 4×4 pixels can be seen here in the bold-bordered 4×4 frame block. In order to apply mode 0, four pixels (see reference signs X) of the reconstructed frame block which is located above the current reconstructed frame block are required. Analogously thereto, four pixels of that reconstructed frame block which is located to the left of the current reconstructed frame block are required for compressing/decompressing in model.

In order to compress the reconstructed frame, the latter is subdivided into frame regions, the frame regions being compressed independently of one another. This enables frame contents of the reference frame to be accessed in such a way that only frame contents of one of the frame regions need to be processed. There are several variants in the compression procedure.

Figure 6:
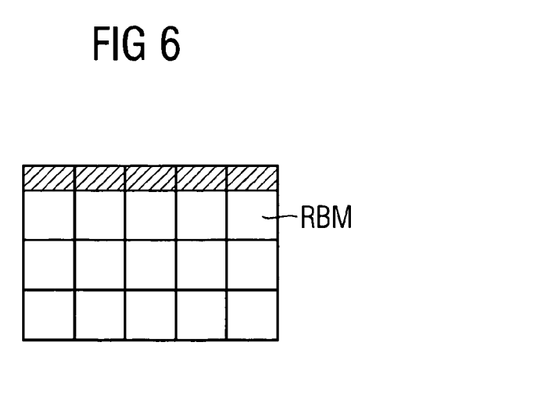
FIG. 6 shows compressed and non-compressed pixels for storing in a reference frame buffer.

Variant 1:

In the first variant, those pixels which cannot be reconstructed within the respective frame region are stored uncompressed in the reference frame buffer. Thus, for example, where exclusive use is made of mode 0, a whole row of pixels located directly above the reconstructed frame blocks that are to be compressed is stored uncompressed in the reference frame buffer. FIG. 6 shows a frame region composed of 3×5 reconstructed frame blocks. In this case the uncompressed pixels are represented by the diagonally striped row above the frame region.

In variant 1, those pixels which can be generated by other regions of the reconstructed frame are generally stored uncompressed in the reference frame buffer. This enables specific frame zones to be accessed within that frame region which resides in compressed form in the reference frame buffer.

Variant 2:

In a variation on variant 1, the uncompressed pixels are stored at least partially in compressed form. For that purpose all the pixels can be set up in a row according to a predefinable rule and compressed by delta coding or another differential coding scheme.

EXAMPLE

Pixel values: 100, 80, 115
Values after differential coding: 100, −20, 15
In this case the first pixel value is transmitted uncoded, and the following pixel values are transmitted differentially.

Variant 3:

There can be a number of intra prediction modes, such as in the case of H.264/AVC for example. A specific mode can then be chosen for each frame region, this mode being applied to all reconstructed frame blocks of the frame region. Alternatively a predefinable sequence of intra prediction modes can also be determined for compressing a sequence of reconstructed frame blocks, such as, for example:
Mode 1->mode 0->mode 1->mode 0-> . . .

In this case a first reconstructed frame block is compressed by mode 1, a second reconstructed frame block by mode 0, a third reconstructed frame block by mode 1, etc. The sequence of the modes can be stored in the reference frame buffer so as to achieve an individualization of the compression.

Variant 4:

As well as the intra prediction modes there can also be an intra coding mode which encodes a frame block without reference information. In this variant the intra coding mode is accordingly designated as mode 9, in addition to the intra prediction modes 0-8.

First, it is determined which of the modes 0 to 9 has the least storage space requirement, taking into account the storage requirement for signaling the coding mode and for storing pixels which cannot be determined by the frame region and which are required for the respective mode.

Second, the compressed data is compressed by compression of the respective reconstructed frame block on the basis of that mode that has the least storage space requirement and stored in the reference frame buffer together with the information required for the decompression. This information includes details of the mode and pixels which cannot be reconstructed by the frame region.

Since the intra coding mode is also taken into account in this variant, the storage space requirement for storing the compressed data is minimized.

Variant 5:

In another variation the frame compression unit can also perform a quantization of the data generated by the intra prediction and/or intra coding mode. If the quantization factor cannot be determined implicitly, it is stored in the reference frame buffer.

Variant 6:

In a further variation, the frame compression unit generates a standard-compatible data stream for the frame region, for example in the form of slices, and storing the standard-compatible data stream in the reference frame buffer.

At least some of the above-cited variants can be combined. In order to avoid or minimize a drift between encoder and decoder, information stored in the reference frame buffer in addition to the compressed data in the respective variants can be inserted into the output signal and transmitted from the encoder to the decoder.

In a further exemplary embodiment two reference frames are stored in the reference frame buffer in each case. A first reference frame, compressed by intra prediction, is stored in the reference frame buffer. A second reference frame, compressed by an inter coding mode, is stored in the reference frame buffer. For each reconstructed frame block, a search is conducted here in the first reference frame stored in the reference frame buffer for a reference frame block. In this reference frame block search a motion vector may be chosen as zero, so that only a small amount of information needs to be stored in the reference frame buffer in addition to the compressed data. Here, too, the frame compression units in the encoder and decoder or, as the case may be, the frame decompression units must compress and decompress the respective reference frame in the same way. In a development of this variant the even-numbered reconstructed frames are stored compressed by intra prediction and the odd-numbered reconstructed frames are stored compressed by an inter coding mode in the reference frame buffer.

Figure 7:
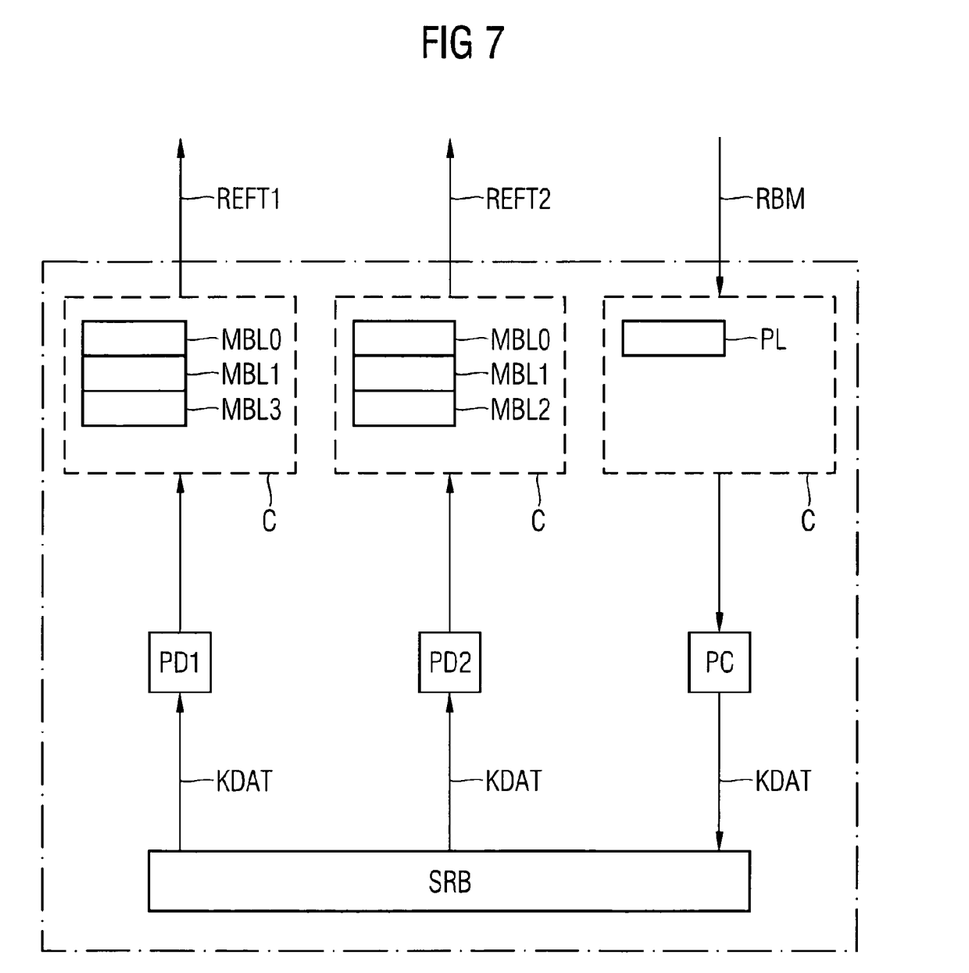
FIG. 7 shows a further exemplary embodiment having two reference frames.

In another exemplary embodiment, see FIG. 7, one reference subframe REFT1, REFT2 in each case can be selected from two reference frames, both stored using intra prediction in the reference frame buffer. In this illustration the dashed areas C represent uncompressed reconstructed frame data in a memory. Thus, at least some of the pixels X of the reconstructed frame block are buffered in the memory for a compression of a reconstructed frame block that is subsequently to be processed. In order to enable easy access to subzones of the reference subframes, for example for the motion estimation unit ME or the motion compensation unit MC, for each of the reference frames at least parts are made available in the memory as reference subframes REFT1, REFT2 by the respective frame decompression unit PD1, PD2. In FIG. 7, the macroblock rows MBL0, MBL1 and MBL2 are stored per reference subframe in the memory. As well as the possibility of providing a single instance for the frame decompression unit, it can be advantageous also to make multiple instances available, such as PD1, PD2 for example. This has the advantage that the respective reference subframes can be decompressed in parallel. If specific frame data is no longer required by the respective frame decompression unit or frame compression unit, the data can be deleted from the memory. In one embodiment this deletion can be effected like a sliding window.

A number of reference frames to be stored in the reference frame buffer can be signaled between encoder and decoder.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for storing at least one frame zone of a reconstructed frame generated by a frame encoding device or a frame decoding device, and providing the at least one frame zone as a reference frame for the frame encoding device or the frame decoding device, the method comprising:
   compressing the at least one frame zone into compressed data based on a first rule;
   storing the compressed data; and
   decompressing the compressed data into the at least one frame zone based on a second rule inverse to a third rule defining a coding mode of the frame encoding device, the first rule being formed based on the third rule.

2. The method as claimed in claim 1, wherein said storing stores the compressed data with a first index in a reference frame buffer, the first index including an identifier for uniquely identifying the first rule or the second rule.

3. The method as claimed in claim 1, wherein said storing stores the compressed data in accordance with a syntax for generating an output data stream which is generated by the frame encoding device and/or is received by the frame decoding device.

4. The method as claimed in claim 3, wherein a plurality of frame zones of the reconstructed frame are combined into a frame region and stored as decompressible independently of other frame regions of the reconstructed frame.

5. The method as claimed in claim 4, wherein respective frame zones of the frame region are compressed according to one of a single first rule and a sequence of respective first rules.

6. The method as claimed in claim 5, wherein said storing of at least some of the frame zones of the frame region are compressed by an intra prediction mode that includes storing, in addition to the compressed data of the frame region, first pixels required for reconstructing at least one pixel of the frame region and that can be determined solely by a different frame region.

7. The method as claimed in claim 6, wherein the first pixels are compressed and stored according to a delta coding scheme.

8. The method as claimed in claim 7, wherein at least one of the frame zones of the frame region is compressed by an intra coding mode instead of by the intra prediction mode.

9. The method as claimed in claim 7, wherein the coding mode is selected from available modes to have a lowest storage space requirement for the frame zone to be compressed, the available modes including at least two different intra prediction modes or at least one intra prediction mode and the intra coding mode.

10. The method as claimed in claim 9, wherein said storing includes storing a quantization parameter used for intra prediction.

11. The method as claimed in claim 3, wherein said storing includes storing at least two reconstructed frames, including a first reconstructed frame compressed by at least one of an intra prediction mode and an intra coding mode and a second reconstructed frame, following the first reconstructed frame in time, compressed by an inter coding mode whose motion vectors point to the first reconstructed frame.

12. The method as claimed in claim 3, wherein the first rule is generated based on the third rule by one of
when the third rule describes an intra coding mode, the first rule is formed by the intra coding mode,
when the coding mode defined by the third rule describes a macroblock/frame block to be coded without a motion vector and the reference frame of the macroblock/frame block is coded by the intra coding mode, the first rule is the intra coding mode used for coding the reference frame, and
when the third rule for the macroblock/frame block uses the inter coding mode with associated motion vectors, the first rule is identical to the third rule and the motion vector for the inter coding mode is chosen identically to the third rule and the first rule.

13. The method as claimed in claim 12,
wherein at least one parameter is signaled between the frame encoding device and the frame decoding device to synchronize the method in the frame encoding device and in the frame decoding device, the at least one parameter selected from the group consisting of a quantization factor used in an intra prediction mode or an intra coding mode for compressing at least one of the frame, zones and a second index for one of a frame zone and a frame region of the reconstructed frame, the second index including an identifier uniquely identifying one of the first rule and the second rule.

14. A storage device for storing at least one frame zone of a reconstructed frame that has been generated by a frame encoding device or a frame decoding device, and providing the at least one frame zone as a reference frame for the frame encoding device or the frame decoding device, the storage device comprising:
a frame compression unit compressing the at least one frame zone into compressed data based on a first rule;
a memory storing the compressed data; and
a frame decompression unit decompressing the compressed data into the at least one frame zone based on a second rule inverse to a third rule defining a coding mode of the frame encoding device, the first rule being formed based on the third rule.

15. A storage device for storing at least one frame zone of a reconstructed frame that has been generated by a frame encoding device or a frame decoding device, and providing the at least one frame zone as a reference frame for the frame encoding device or the frame decoding device, the storage device comprising:
at least one processor compressing the at least one frame zone into compressed data based on a first rule and decompressing the compressed data into the at least one frame zone based on a second rule inverse to a third rule defining a coding mode of the frame encoding device, the first rule being formed based on the third rule; and
a memory storing the compressed data.

\* \* \* \* \*